UNITED STATES PATENT OFFICE.

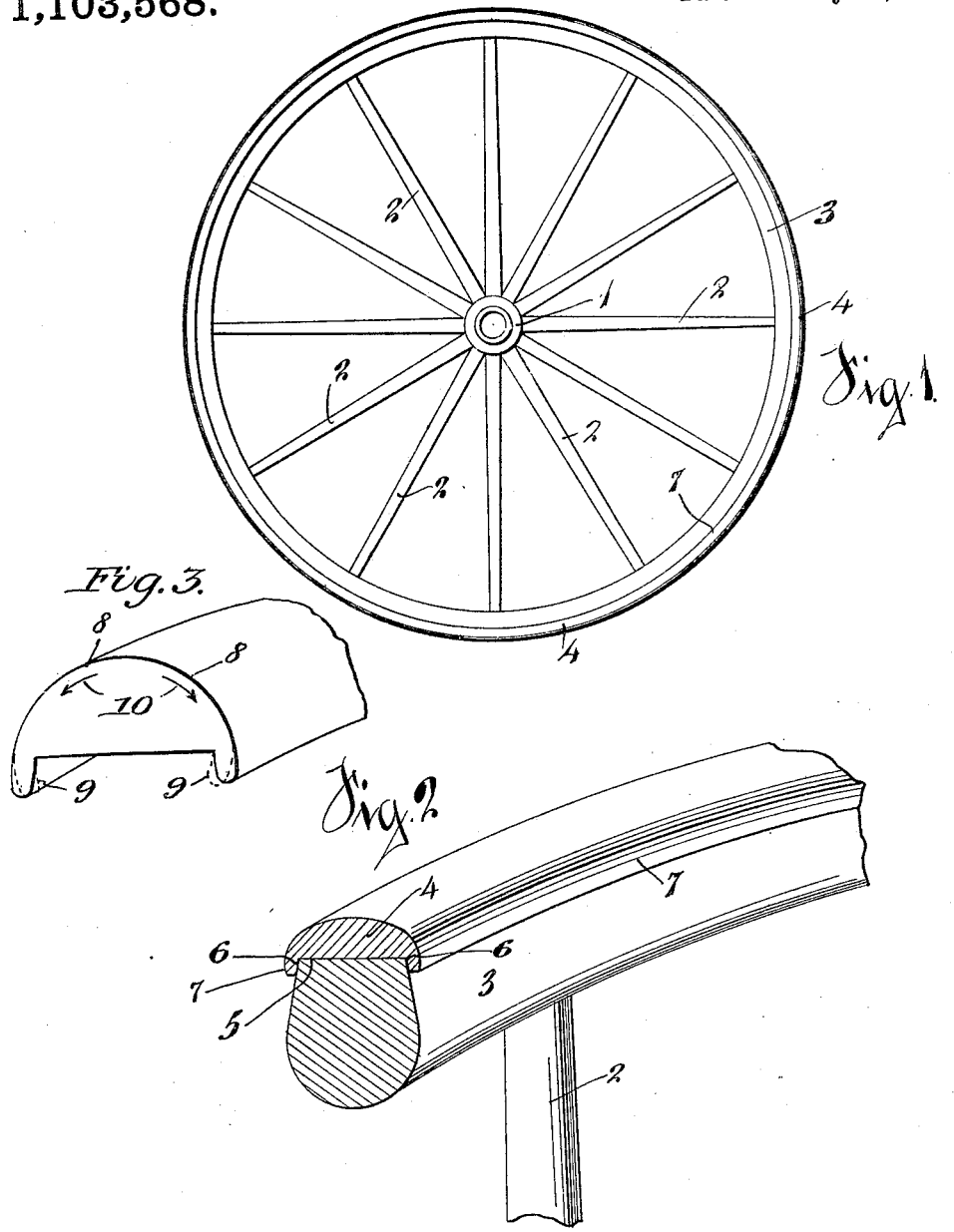

JOHN D. CRAFT, OF EVANSVILLE, INDIANA.

VEHICLE-TIRE.

1,103,568.  Specification of Letters Patent.  Patented July 14, 1914.

Application filed August 23, 1912.  Serial No. 716,640.

*To all whom it may concern:*

Be it known that I, JOHN D. CRAFT, a citizen of the United States, and a resident of the city of Evansville, in the county of Vanderburg and State of Indiana, have invented certain new and useful Improvements in Vehicle-Tires, of which the following is a full, clear, and exact description, reference being had to the accompanying drawings, forming part of this specification.

My invention relates to metallic tires for vehicle wheels and its especial object is to provide a construction in which the surface between the felly and the tire may be effectively and permanently sealed from the entrance of air, moisture and dirt, and thus the life of the wheel greatly prolonged.

One of the chief difficulties met with in the ordinary vehicle wheel constructions is the tendency of the tire to separate from the wooden felly on account of the shrinkage of the felly when in use due to the swelling and expansion of the wooden rim when exposed to the elements and the subsequent shrinking of the wood as it dries out. To prevent this, tires have always been shrunk on the rim, either by the very old method of welding the tire band of the size to give the proper dish to the wheel and to firmly and rigidly grasp the rim when in place, then by expanding the tire with heat and slipping it over the rim and then contracting it with a cold water bath, to shrink it to place, or by the more modern method of constructing the tire of a size to slip over the rim when cold, and then with a tire shrinker, mechanically upsetting and contracting the band into place.

The more ordinary vehicle tire is a metallic band, rectangular in cross section, which is shrunk in place by either of the methods above described, and is then held in place by a series of bolts or rivets through the rim and felly, usually a bolt or rivet between each spoke. The bolt holes necessarily weaken the rim. That they are necessary demonstrates the inefficiency of merely shrinking over the rim a flat tire rectangular in cross section. Such tires ultimately allow dirt and moisture to creep in between the tire and rim, causing undue swelling and expansion and the subsequent undue shrinkage upon drying out, which loosens up the tire. The wear on the flat rectangular tire is also at the edges grinding down and thinning the tire, wearing off the paint on the sides of the rim and exposing the wood more and more to the elements.

Efforts have been made to avoid the effects of wear on the edges of the tire by making the tire thicker at the edges with a consequent peripheral concavity for the outer surface, and internal peripheral channels or grooves have been formed in the under surface of the tire to allow for a free air circulation, which later construction is supposed to prevent the detrimental effect of moisture seeping in between tire and rim. Inwardly projecting flanges to engage the side edges of the rim have also been employed with such constructions, but the locking effect of the flanges is a detriment to the air circulation in the passages and these passages would seem to be convenient channels for the accumulation of dirt and moisture, which, as above stated, it is the especial object of my invention to avoid. Moreover with the older constructions of flanged tires, the hammering of the road wears down the tire, and the blows are distributed over the entire width of the tire. The effect of this is to stretch the metal transversely and widens the space between the flanges. The flanges come away from the sides of the felly or tend to spread out. Moisture is allowed to creep in underneath the tire which rusts the tire and rots the wood of the felly, thus rapidly loosening the tire and shortening the life of the wheel.

My invention entirely abandons the theory that the loosening of the tire can be avoided by providing air passages between tire and rim, and as already stated, consists of that novel construction to be hereinafter pointed out and claimed whereby a tight and intimate contact is maintained between the parts by the use of projecting flanges to lock over the sides of the felly and by shaping the wearing surface of the tire to bring the wear upon the central portion and away from the side edges. The hammering of the road material takes effect more directly along the median line, and by reason of the thickness of the metal, the outer surface alone of the metal is stretched or pushed transversely. This stretching of the outer surface manifests itself on the flanges, and instead of spreading outwardly, they are turned inwardly causing the flanges to bite more effectively the sides of the felly and thus to become tighter with use.

In the drawings, Figure 1 is a front elevation of a vehicle wheel with my improved tire. Fig. 2 is a cross sectional view of a portion of the felly and tire. Fig. 3 is a sectional perspective view of a portion of the tire illustrating the effect of wear in tightening the flanges on the sides of the rim.

The hub of an ordinary vehicle wheel is indicated by the numeral 1, with spokes 2, 2, and wooden felly or rim 3, upon which is shrunk my improved metallic tire 4. The tire is formed with a channel 5, with slightly flaring sides 6 to provide side flanges 7, 7, to engage over the side edges of the felly. The outer contour of the tire is of oval or rounded shape, forming a tire gradually increasing in thickness from the sides to the middle portion as shown in the sectional view. The tire is seated on the rim by any of the methods now in use, but preferably with a tire shrinker, so that the tire is formed of a size to allow it to be slipped or forced over the rim while cold, and with a tire shrinker the metal band is upset and compressed tightly over the rim to give the proper dish to the wheel and to lock the tire firmly and securely in place. A perfectly tight joint is thus formed over the side edges of the felly, impervious to moisture and the attack of the elements. The slight flare on the inside of the side flanges insures a close and absolutely tight fit, not possible with perpendicular sides. With this construction, it is not necessary to provide bolts or rivets to secure the tire on the rim, and the tire will be held rigidly in place by the side flanges, thus avoiding the weakening of the wood felly by the usual series of bolt openings.

The rounded contour of the tire provides a wearing surface in the thickest portion of the tire at the middle and all the blows on the wheel when in use are received by this middle portion, and the hard road material, stones and the like, gives a glancing blow to the side portions. The wheel rides much easier for this reason, and as the contact surface with the ground is narrower, there is little or no likelihood of skidding. The rounded surface also avoids the suction of the flat tire with its much broader surface and less power is required to propel the vehicle. As the wear is removed from the sides of the tire, they will not wear there, and the flanges prevent any seeping in of dirt or moisture between the tire and the felly. The life of the wheel is thus greatly prolonged, while a much neater and more attractive wheel in appearance is the result. Moreover as illustrated in Fig. 3, the effect of the hammering between the points 8, 8, when the tire is in use causes the surface of the metal to stretch in the direction shown by the arrows 10, 10. This flow of the metal has a tendency to cause the side flanges to take the position indicated by the dotted lines 9, 9. In view of this result, applicant in combining the oval shaped tire with the side flanges has accomplished an entirely novel result and has selected the exact combination of parts with which this entirely novel and beneficial result is obtained.

Having thus described my invention, what I claim as new and desire to secure by Letters Patent, is:—

1. In a vehicle wheel, the combination with the felly, of a metallic tire thicker in cross section at the middle than at the sides and of oval contour for a wearing surface to bring the wear upon the thickest portion of the tire, and provided with a channel forming side flanges to fit over the side edges of the felly, with the metal adapted to spread on the surface when in use to cause the flanges to more firmly grip the side edges of the felly and prevent the entrance of dirt and moisture between the tire and the rim.

2. In a vehicle wheel, the combination with the felly, of a metallic tire thicker in cross section at the middle than at the sides and of oval contour for a wearing surface to bring the wear upon the thickest portion of the tire, and provided with a channel forming side flanges, with inside flaring walls, to fit over the side edges of the felly, with the metal adapted to spread on the surface when in use to cause the flanges to more firmly grip the side edges of the felly and prevent the entrance of dirt and moisture between the tire and the rim.

3. In a vehicle wheel, the combination with the felly, of a metallic tire thicker in cross section at the middle than at the sides and of oval contour for a wearing surface to bring the wear upon the thickest portion of the tire, and provided with a channel, the channel having a flat base and slightly flaring side walls, the base to make close contact with the periphery of the felly and the side walls to engage over the side edges thereof, with the metal adapted to stretch on the surface when in use to cause the flanges to more firmly grip the edges of the felly and prevent the entrance of dirt and moisture between the tire and the rim.

JOHN D. CRAFT.

Attest:
F. M. HILLS,
S. E. LIGHT.

---

Copies of this patent may be obtained for five cents each, by addressing the "Commissioner of Patents, Washington, D. C."